United States Patent
Konokawa et al.

(10) Patent No.: US 8,642,159 B2
(45) Date of Patent: Feb. 4, 2014

(54) FILM AND METHOD OF MANUFACTURING THE SAME, LAMINATED FILM OR SHEET, AND LAMINATED BODY

(75) Inventors: Yuhei Konokawa, Hiroshima (JP); Yoshinori Abe, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/697,672

(22) PCT Filed: May 13, 2011

(86) PCT No.: PCT/JP2011/061043
§ 371 (c)(1),
(2), (4) Date: Jan. 28, 2013

(87) PCT Pub. No.: WO2011/142453
PCT Pub. Date: Nov. 17, 2011

(65) Prior Publication Data
US 2013/0202847 A1  Aug. 8, 2013

(30) Foreign Application Priority Data

May 14, 2010 (JP) ................................. 2010-111618
Jan. 7, 2011 (JP) ................................. 2011-001905

(51) Int. Cl.
*D06N 7/04* (2006.01)
*B29C 47/56* (2006.01)
*C08L 27/12* (2006.01)

(52) U.S. Cl.
USPC ........................... 428/141; 264/40.1; 525/199

(58) Field of Classification Search
None
See application file for complete search history.

(56) References Cited

U.S. PATENT DOCUMENTS

| | | | | |
|---|---|---|---|---|
| 5,593,730 A | * | 1/1997 | Satgurunathan et al. | 427/386 |
| 6,506,843 B1 | * | 1/2003 | Tsuda et al. | 525/199 |
| 2005/0187354 A1 | | 8/2005 | Bonnet et al. | |
| 2011/0155303 A1 | * | 6/2011 | Hansen et al. | 156/184 |

FOREIGN PATENT DOCUMENTS

| | | |
|---|---|---|
| CN | 101696309 | 4/2010 |
| EP | 0 386 711 | 9/1990 |
| JP | 60-67133 | 4/1985 |
| JP | 61/078857 | 4/1986 |
| JP | 01-096238 | 4/1989 |
| JP | 05-249315 | 9/1993 |
| JP | 10-008008 | 1/1998 |
| JP | 2008-211034 | 9/2008 |
| WO | 2006/016618 | 2/2006 |

OTHER PUBLICATIONS

Database WPI, Thomas Scientific, Accession No. 1985-130868, Apr. 17, 1985.
European Search Report for Application No. 11780709.9 dated Oct. 4, 2013.
Chinese Office Action for Application No. 201180023720.4 dated Jul. 15, 2013 (English language summary of relevant part).
Chinese Office Action for Application No. 201180023720.4 dated Jul. 15, 2013.

* cited by examiner

*Primary Examiner* — David Sample
*Assistant Examiner* — Nicole T Gugliotta
(74) *Attorney, Agent, or Firm* — Morgan, Lewis & Bockius LLP

(57) ABSTRACT

Provided is a film having high crystallinity, transparency, and surface smoothness, a lamination of the film, a sheet of the film, and a laminated body. A film contains vinylidene fluoride-based resin (A) and acrylic-based resin (B). The film has at least one surface with arithmetic mean roughness of 0.1 to 20 nm. The at least one surface has crystal fusion heat of 18 to 40 J/g and a haze value of 3.5 or less, the crystal fusion heat being measured using a differential scanning calorimeter.

14 Claims, No Drawings

FILM AND METHOD OF MANUFACTURING THE SAME, LAMINATED FILM OR SHEET, AND LAMINATED BODY

TECHNICAL FIELD

The present invention relates to a film, a method of manufacturing the film, a laminated film or sheet, and a laminated body.

BACKGROUND ART

Since vinylidene fluoride-based resin has excellent weather resistance, heat resistance, chemical resistance, and electrical characteristics and can be easily formed, the vinylidene fluoride-based resin is used for many applications.

Among many applications, for example, when the vinylidene fluoride-based resin is used for a solar cell film, a film for automobile interior decoration, and a greenhouse film for agriculture, high transparency has also been required as well as the above-described characteristics.

To increase the transparency of a film obtained from the vinylidene fluoride-based resin, for example, a method of lowering degree of crystallinity by copolymerization of vinylidene fluoride and hexafluoropropylene to increase film transparency is known. However, to increase the transparency, it is required that the content of a copolymerization component unit in a copolymer is comparatively high. Accordingly, the crystalline melting point of the copolymer becomes lower than the crystalline melting point of a vinylidene fluoride homopolymer. This causes a problem of lowering heat resistance.

As a film excellent in transparency using vinylidene fluoride-based resin, Patent Literature 1 proposes a vinylidene fluoride-based film, which is obtained using a composition including 50 to 99.9 parts by weight of vinylidene fluoride-based resin (D) and 0.1 to 50 parts by weight of methacrylic-based resin composition (C). However, the film with excellent transparency disclosed in PLT 1 is a film where a vinylidene fluoride-based resin film with the thickness of approximately several μm is laminated on a base resin layer that is obtained from a methacrylic-based resin composition (C). In contrast, if a vinylidene fluoride-based resin film with the thickness of approximately several tens to 100 μm is laminated, the transparency of the obtained laminated film is insufficient.

Furthermore, Patent Literature 2 proposes a film that includes polyvinylidene fluoride resin (A) and polymethacrylic resin (B) and is stretched under a specific condition. However, the film disclosed in PLT 2 does not have sufficient transparency when the film is not stretched.

In addition, Patent Literature 3 discloses a stretch film including polyvinylidene fluoride and polymethylmethacrylate with the thickness of 130 μm. However, this stretch film does not have sufficient heat resistance.

CITATION LIST

Patent Literature

Patent Literature 1: WO 2006/016618 A
Patent Literature 2: JP-A-61-78857
Patent Literature 3: JP-A-5-249315

SUMMARY OF INVENTION

Technical Problem

It is an object of the present invention to provide a film having high crystallinity, transparency, and surface smoothness, and a method of manufacturing the film, and a laminated film or sheet using this film, and a laminated body.

Solutions to Problem

The aforementioned object is achieved by the following present inventions (1) to (12).

(1) A film contains vinylidene fluoride-based resin (A) and acrylic-based resin (B) wherein the film has at least one surface with arithmetic mean roughness of 0.1 to 20 nm, the film having crystal fusion heat of 18 to 40 J/g and a haze value of 3.5 or less, and the crystal fusion heat being measured using a differential scanning calorimeter.

(2) A method of manufacturing the film according to (1) comprising melt-extruding a resin composition containing 75 to 95% by mass of the vinylidene fluoride-based resin (A) and 5 to 25% by mass of the acrylic-based resin (B), wherein the vinylidene fluoride-based resin (A) has a melt mass-flow rate equal to or more than 10 [g/10 minutes], and the melt mass-flow rate is measured in compliance with JISK7210 under conditions of 230° C. and a load of 3.8 kg.

(3) A method of manufacturing a film comprising melt-extruding a resin composition containing 75 to 95% by mass of vinylidene fluoride-based resin (A) and 5 to 25% by mass of acrylic-based resin (B), and subsequently bringing the obtained melt extrudate into contact with at least one chill roll having the surface temperature of 35 to 75° C., wherein the vinylidene fluoride-based resin (A) has a melt mass-flow rate equal to or more than 10 [g/10 minutes] minutes, and the melt mass-flow rate is measured in compliance with JISK7210 under conditions of 230° C. and a load of 3.8 kg.

(4) The method of manufacturing the film according to (2) or (3), wherein the acrylic-based resin (B) is resin containing equal to or more than 50% by mass of an alkyl methacrylate unit wherein the alkyl methacrylate unit contains an alkyl group with 1 to 4 carbon atoms.

(5) A film obtained by the manufacturing method according to (2) or (3).

(6) A film obtained by the manufacturing method according to (4).

(7) A laminated film or a laminated sheet where a thermoplastic resin layer is laminated on the film according to (5).

(8) A laminated film or a laminated sheet where a thermoplastic resin layer is laminated on the film according to (6).

(9) A laminated body where a base material is laminated on the film according to (5).

(10) A laminated body where a base material is laminated on the film according to (6).

(11) A laminated film or a laminated sheet where a thermoplastic resin layer is laminated on the film according to (1).

(12) A laminated body where a base material is laminated on the film according to (1).

Advantageous Effects of Invention

The present invention provides a film that is excellent in heat resistance and transparency with a small haze value even if the film is thick.

DESCRIPTION OF EMBODIMENTS (Vinylidene Fluoride-Based Resin (A))

Vinylidene fluoride-based resin (A) used in this present invention has a melt mass-flow rate (hereinafter referred to as "MFR") of equal to or more than 10 [g/10 minutes]. If the MFR is equal to or more than 10 [g/10 minutes], melt viscosity at manufacture of a film can be set to an appropriate range. Thus, unevenness on a film surface (arithmetic mean roughness), which is one cause of deterioration of transparency and increase in a haze value of a manufactured film, can be reduced to small.

The mass-average molecular weight of the vinylidene fluoride-based resin (A) where the MFR is equal to or more than 10 [g/10 minutes] is usually equal to or less than 350,000. The mass-average molecular weight of the vinylidene fluoride-based resin (A) is measured as follows. Gel permeation chromatography (GPC) measurement using dimethylformamide as a solvent is performed and then calibration is performed using polystyrene with known molecular weight as a standard sample. Note that the MFR is a value measured in compliance with JISK7210 and under conditions of 230° C. and a load of 3.8 kg.

To ensure excellent film transparency, the MFR of the vinylidene fluoride-based resin (A) preferably has equal to or more than 12 [g/10 minutes].

The vinylidene fluoride-based resin (A) includes, for example, a polymer or a copolymer including a vinylidene fluoride unit equal to or more than 85% by mass. If the vinylidene fluoride-based resin (A) is a copolymer, a copolymerizable component, which is copolymerized with the vinylidene fluoride, includes, for example, hexafluoropropylene and tetrafluoroethylene.

As the vinylidene fluoride-based resin (A), it is preferred that polyvinylidene fluoride be used to obtain a film with excellent transparency and heat resistance.

In the present invention, as the vinylidene fluoride-based resin (A), one with high crystalline melting point is preferred. In the present invention, the crystalline melting point represents melting peak temperature when measured in compliance with the method described in JIS K7121, 3.(2). The crystalline melting point of the vinylidene fluoride-based resin (A) is preferably equal to or more than 150° C., more preferably equal to or more than 160° C. The upper limit of the crystalline melting point is approximately 175° C., which is equal to the crystalline melting point of the polyvinylidene fluoride.

The vinylidene fluoride-based resin (A) may be used alone or in combination of two or more kinds.

The vinylidene fluoride-based resin (A) such as Kynar720 and Kynar710 manufactured by Arkema Inc., KFT#850 manufactured by KUREHA CORPORATION, and Solef1006 and 1008 manufactured by Solvay Solexis, Inc. is industrially available.

(Acrylic-Based Resin (B))

Acrylic-based resin (B) used in the present invention includes, for example, a homopolymer or a copolymer that includes 50 to 100% by mass of an alkyl methacrylate unit (B1) where the alkyl group contains 1 to 4 carbon atoms and 0 to 50% by mass of another vinyl monomer unit (B2). The acrylic-based resin (B) may be used alone or in combination of two or more kinds.

As the acrylic-based resin (B), in that a film with high surface hardness is obtained, the content of the alkyl methacrylate unit (B1) where the alkyl group contains 1 to 4 carbon atoms has preferably equal to or more than 50% by mass, more preferably equal to or more than 70% by mass, further preferably equal to or more than 80% by mass.

Alkyl methacrylate (b1) with 1 to 4 carbon atoms, which is a material for forming the alkyl methacrylate unit (B1) with 1 to 4 carbon atoms in the acrylic-based resin (B), includes, for example, the following: methyl methacrylate, ethyl methacrylate, n-propyl methacrylate, i-propyl methacrylate, n-butyl methacrylate, i-butyl methacrylate, and t-butyl methacrylate. These materials may be used alone or in combination of two or more kinds.

A material for forming another vinyl monomer unit (B2) in the acrylic-based resin (B) is a vinyl monomer (b2) that can be copolymerized with a (b1) component. The material includes, for example, the following: methyl acrylate, ethyl acrylate, n-butyl acrylate, i-butyl acrylate, t-butyl acrylate, 2-ethylhexyl(meth)acrylate, lauryl(meth)acrylate, tridodecyl(meth)acrylate, stearyl(meth)acrylate, cyclohexyl(meth)acrylate, t-butylcyclohexyl(meth)acrylate, phenyl(meth)acrylate, benzyl(meth)acrylate, and isobornyl(meth)acrylate. Among these materials, methyl acrylate is preferred from the aspect of transparency. These materials may be used alone or in combination of two or more kinds. The content of another vinyl monomer unit (B2) in a monomer unit that forms the acrylic-based resin (B) is preferably at 30% by mass or less, more preferably at 10% by mass or less, further preferably at 3% by mass or less.

In the present invention, "(meth)acrylate" represents "acrylate" or "methacrylate".

As another vinyl monomer unit (B2), a monomer unit obtained from the following monomers can be contained to increase adhesiveness with a different material without departing from the object of the present invention. A monomer unit obtained from a functional group-containing monomer such as methacrylic acid, glycidyl(meth)acrylate, tetrahydrofur(meth)acrylate, allyl(meth)acrylate, 2-hydroxyethyl(meth)acrylate, hydroxypropyl(meth)acrylate, methoxyethyl(meth)acrylate, ethoxyethyl(meth)acrylate, diaminoethyl(meth)acrylate, methyl chloride salt of diaminoethyl(meth)acrylate, diethylaminoethyl(meth)acrylate, benzyl chloride salt of diethylaminoethyl(meth)acrylate, phthalic acid 2-methacryloyloxyethyl, and hexahydrophthalic acid 2-methacryloyloxyethyl.

A polymerization method to obtain the acrylic-based resin (B) includes, for example, a suspension polymerization method, an emulsion polymerization method, a solution polymerization method, and a block polymerization method. The suspension polymerization method is preferred in that the obtained resin is excellent in transparency.

In view of obtaining a film with a small haze value, the mass-average molecular weight of the acrylic-based resin (B) is preferably equal to or more than 30,000, more preferably equal to or more than 50,000, further preferably equal to or more than 70,000. On the other hand, in view of obtaining a film containing less foreign material, the mass-average molecular weight of the acrylic-based resin (B) is preferably 180,000 or less, more preferably 150,000 or less, further preferably 120,000 or less. The mass-average molecular weight of the acrylic-based resin (B) is obtained as follows. Gel permeation chromatography (GPC) measurement using tetrahydrofuran as a solvent is performed and then calibration is performed using polystyrene with known molecular weight as a standard sample.

(Film)

The arithmetic mean roughness of the film in the present invention can be obtained by a contour curve (roughness curve), which is obtained by cutting off a long wavelength component from a cross-sectional surface curve using a filter (high-pass filter). These cross-sectional surface curves can be measured using a machine such as a non-contact three-dimensional surface profile/roughness measuring machine, an atomic force microscope, and a laser confocal microscope. For example, New View series manufactured by Zygo Corporation is appropriate as a non-contact three-dimensional surface profile measuring machine for such measurement. To reduce a haze value, the arithmetic mean roughness is preferably 20 nm or less, more preferably 15 nm or less, further preferably 10 nm or less.

The film according to the present invention contains 75 to 95% by mass of the vinylidene fluoride-based resin (A) and 5 to 25% by mass of the acrylic-based resin (B), preferably 80 to 90% by mass of the vinylidene fluoride-based resin (A) and 10 to 20% by mass of the acrylic-based resin (B). The film has high heat resistance and transparency even in the thickness approximately from several tens to 100 μm, and has a small haze value.

The total light transmittance of the film of the present invention is preferably equal to or more than 93.1%, more preferably equal to or more than 93.6%, further preferably equal to or more than 93.9% when measured in compliance with JISK7361-1.

The haze value of the film is preferably 3.5 or less, more preferably 1 or less, further preferably 0.8 or less, and 0.6 or less is particularly preferred when measured in compliance with JISK7105.

In view of heat resistance, the melting peak temperature of the film of the present invention is preferably equal to or more than 150° C., more preferably equal to or more than 160° C. when measured in compliance with the method described in JISK7121, 3.(2). The upper limit of the melting peak temperature, which is almost equal to the melting temperature of a vinylidene fluoride homopolymer, is generally and approximately 175° C.

In the film according to the present invention, assume that the crystal fusion heat is measured in compliance with the method described in JISK7121, 3.(2). In this case, the crystal fusion heat is preferably equal to or more than 18 J/g and 40 J/g or less, more preferably equal to or more than 21 J/g, and most preferably equal to or more than 24 J/g. If the crystal fusion heat is equal to or more than 18 J/g, a film can be manufactured without sticking to a chill roll and a scratch and a blocking upon delivery of the film are prevented. The crystal fusion heat becomes higher by increasing the amount of the vinylidene fluoride-based resin (A) or rising the chill roll temperature. The higher the crystal fusion heat and the melting peak temperature are, the higher the heat resistant of the film is. If the crystal fusion heat is 40 J/g or less, a film with a small haze value can be obtained.

Usually, a film with thin thickness tends to obtain high transparency while a film with thick thickness tends to obtain high mechanical strength. In view of this, the film thickness according to the present invention is preferably 20 to 100 μm, more preferably 25 to 100 μm, further preferably 25 to 50 μm.

In the present invention, surface treatment can be performed on the film surface as necessary to improve a characteristic such as adhesiveness with a different material. The above-described surface treatment includes, for example, corona discharge treatment, ozone treatment, low temperature plasma treatment using gas such as oxygen gas and nitrogen gas, glow discharge treatment, and oxidation treatment using chemicals or the like. Pretreatment may be performed in addition to the surface treatment as necessary.

The film according to the present invention may contain various additives such as an ultraviolet absorbing agent, a light stabilizer, a heat-resistant stabilizer, an anti-blocking agent using a material such as synthetic silica and silicone resin powder, a plasticizer, an antimicrobial agent, a mildew-proofing agent, a bluing agent, and an anti-static agent as necessary.

The ultraviolet absorbing agent absorbs ultraviolet ray in sunlight, converts the ultraviolet ray into harmless heat energy in a molecule, and prevents active species, where photo degradation has been started in resin, from being excited. The ultraviolet absorbing agent includes, for example, the following: a benzoate-based compound, a benzophenone-based compound, a benzotriazole-based compound, a triazine-based compound, a salicylate-based compound, an acrylonitrile-based compound, a metal complex salt-based compound, a hindered amine-based compound, and inorganic-based particles such as ultrafine particle titanium oxide with a particle diameter of approximately 0.01 to 0.06 μm, and ultrafine particle zinc oxide with a particle diameter of approximately 0.01 to 0.04 μm. These materials may be used alone or in combination of two or more kinds.

The content of the ultraviolet absorbing agent is, for example, preferably 0.1 to 10 parts by mass with respect to 100 parts by mass, which is the sum of the vinylidene fluoride-based resin (A) and the acrylic-based resin (B).

The light stabilizer captures a radical generated in resin to stabilize the resin, thus preventing the degradation of the resin. The light stabilizer includes, for example, a hindered amine-based or a phenol-based light stabilizer such as an N—H type, an N—CH3 type, an N-acyl type, and an N—OR type. The content of the light stabilizer is, for example, preferably 0.1 to 10 parts by mass with respect to 100 parts by mass, which is the sum of the vinylidene fluoride-based resin (A) and the acrylic-based resin (B).

The heat-resistant stabilizer is for preventing heat deterioration of resin or a similar problem. The heat-resistant stabilizer includes, for example, a phenol-based, an amine-based, a sulfur-based, or phosphoric acid-based oxidation inhibitor. The content of the heat-resistant stabilizer (oxidation inhibitor) is, for example, preferably 0.1 to 10 parts by mass with respect to 100 parts by mass, which is the sum of the vinylidene fluoride-based resin (A) and the acrylic-based resin (B).

In the present invention, a polymerized form may be used as the above-described ultraviolet absorbing agent or oxidation inhibitor. For example, the polymerized form includes the ultraviolet absorbing agent or the oxidation inhibitor that is chemically bonded with a main chain or a side chain of a polymer.

(Method of Manufacturing the Film)

The film of the present invention is manufactured by the following method. First, a resin composition including the vinylidene fluoride-based resin (A) and the acrylic-based resin (B) is melt-extruded. Next, the obtained melt extrudate is brought into contact with at least one chill roll to manufacture a film. The surface temperature of the chill roll is 35 to 75° C., preferably 40 to 60° C., and more preferably 40 to 50° C. A melt extrusion method includes a T-die method, an inflation method, and a similar method. Especially, the T-die method is preferred in an economical aspect. The melt extrusion temperature is preferably approximately 150 to 235° C. Additionally, an extruder includes, for example, a single screw extruder and a twin screw extruder.

In the present invention, a chill roll means a roll that can regulate its surface temperature using a refrigerant. The melt extrudate discharged from a T-die comes into contact with the chill roll and is cooled to the surface temperature of the chill roll. The chill roll may be, for example, a touch roll with a mirror surface, which is made of metal and an endless belt, which is made of metal. Single chill roll or a plurality of chill rolls may be used. Furthermore, a melt extrudate may be sandwiched by two chill rolls for manufacturing a film.

In the present invention, when a film is manufactured using a T-die method, the setting temperature of the T-die is preferably 260° C. or less, more preferably 250° C. or less, further preferably 240° C. or less. With these temperatures, a film with a small haze value can be obtained even if the chill roll temperature is set to high.

The setting temperature of the T-die is preferably equal to or more than 200° C., more preferably equal to or more than 210° C., further preferably equal to or more than 220° C. With these temperatures, a film having small arithmetic mean roughness can be obtained.

When a film is manufactured using the T-die method, the opening degree of a T-die lip is preferably equal to or more than 0.2 mm, more preferably equal to or more than 0.4 mm, further preferably equal to or more than 0.6 mm. With these opening degrees, a film having small arithmetic mean roughness and small thermal shrinkage can be obtained. The opening degree of the T-die lip is preferably 1 mm or less, more preferably 0.8 mm or less, further preferably 0.6 mm or less. With these opening degrees, a film with small film thickness variation in the width direction can be obtained.

The rotation speed of the chill roll (film take-up speed) is preferably 1 to 15 m/minute.

By setting the surface temperature of the chill roll to equal to or more than 35° C., a film with high heat resistance can be obtained. Furthermore, by setting the surface temperature of the chill roll to 75° C. or lower, a film with high transparency can be obtained.

In the present invention, the melt extrudate is brought into contact with the chill roll to manufacture a film. When a two or more-layer film including the film of the present invention and another film is manufactured, the film of the present invention may be used as a chill roll side film and may be directly brought into contact with the chill roll. Alternatively, the other film may be used as a chill roll side film, and the film may be indirectly brought into contact with the chill roll via the other film. With this cooling method, a film having small arithmetic mean roughness can be obtained even in the non-chill roll surface side.

By manufacturing a film using the above-described cooling method, the surface smoothness of the obtained film can be improved. This surface smoothness prevents printing omission in printing on the film.

In a method where a film is manufactured by sandwiching a melt extrudate by a plurality of chill rolls, it is preferred to sandwich the melt extrudate substantially without a bank (resin rich area) and perform surface transfer without actual rolling for manufacturing a film.

When a film is manufactured without forming the bank, the surface transfer is performed without rolling a melt extrudate during a cooling process. This reduces a heat shrinkage rate of a film manufactured by this method.

When a film is manufactured by sandwiching a melt extrudate by a plurality of chill rolls, a forming process such as embossing and matting may be performed on a surface of at least one chill roll. By this process, the shape can be transferred on one or both surfaces of the film.

(Laminated Film or Sheet)

A thermoplastic resin layer may be further laminated on the film, which is obtained using the manufacturing method of the present invention, so as to form a laminated film or sheet.

A known thermoplastic resin may be used as a material for producing the thermoplastic resin layer. The thermoplastic resin includes, for example, the following: acrylic-based resin; ABS resin (acrylonitrile-butadiene-styrene copolymer); AS resin (acrylonitrile-styrene copolymer); polyvinyl chloride resin; polyolefin-based resin such as polyethylene, polypropylene, polybutene, and polymethylpentene; polyolefin-based copolymer such as ethylene/vinyl acid copolymer or its saponified product and ethylene-(meta) acrylic ester copolymer; polyester-based resin such as polyethylene terephthalate, polybutylene terephthalate, polyethylene naphthalate, polyarylate, and polycarbonate; polyamide-based resin such as 6-nylon, 6,6-nylon, 6,10-nylon, and 12-nylon; polystyrene resin; cellulose derivative such as cellulose acetate and nitrocellulose; fluorine-based resin such as polyvinyl fluoride, polyvinylidene fluoride, polytetrafluoroethylene, and ethylene-tetrafluoroethylene copolymer; and a copolymer, a mixture, a complex, a laminated body, or a similar material containing two or three or more kinds that are selected from these materials.

The material forming the thermoplastic resin layer may contain a general compounding agent, for example, a stabilizer, an oxidation inhibitor, a lubricant, a processing aid, a plasticizer, an impact-resistant agent, a foaming agent, a filler, an antimicrobial agent, a mildew-proofing agent, a mold release agent, an anti-static agent, a colorant, an ultraviolet absorbing agent, a light stabilizer, a heat stabilizer, a flame-retardant agent, or a similar agent as necessary.

The thickness of the thermoplastic resin layer may be appropriately determined as necessary. Usually, approximately 1 to 500 µm is preferred. The thermoplastic resin layer preferably has a film appearance with a completely smooth top surface and to has the thickness to allow surface defect of a base material to be absorbed.

As a method of obtaining a laminated film or sheet, methods such as co-extrusion, application, heat lamination, dry lamination, wet lamination, and hot melt lamination are known. Extrusion lamination can laminate the film and the thermoplastic resin layer.

(Laminated Body)

A laminated body of the present invention includes a film, which is obtained using the manufacturing method of the present invention, a lamination or a sheet of the obtained film on a base material. The material of the base material includes: resin; a wooden board such as a single wooden plate, a plywood, a particle board, and a medium-density fiberboard (MDF); a woody plate such as a wood fiberboard; and metal such as iron and aluminum.

As for resin, any kind of known resin may be used. The resin includes, for example, the following: polyolefin-based resin such as polyethylene, polypropylene, polybutene, polymethylpentene, ethylene-propylene copolymer, ethylene-propylene-butene copolymer, and olefin-based thermoplastic elastomer; general-purpose thermoplastic or thermosetting resin such as polystyrene resin, ABS resin (acrylonitrile-butadiene-styrene copolymer), AS resin (acrylonitrile-styrene copolymer), acrylic-based resin, urethane-based resin, unsaturated polyester resin, and epoxy resin; general-purpose engineering resin such as polyphenylene oxide/polystyrene-based resin, polycarbonate resin, polyacetal, polycarbonate-modified polyphenylene ether, and polyethylene terephthalate; super engineering resin or a similar material such as polysulfone, polyphenylene sulfide, polyphenylene oxide, polyetherimide, polyimide, liquid crystalline polyester, and polyallyl-based heat-resistant resin; composite resin, various modified resin, or a similar material in which a reinforcing material such as glass fiber or inorganic filler (e.g. talc, calcium carbonate, silica, mica) or a modifying agent such as a rubber component is added.

Among these materials, a material that can be melt-bonded with a film, a lamination of the film or a sheet of the film is preferred to be used for the base material. For example, the material for the base material includes acrylic-based resin, ABS resin, AS resin, polystyrene resin, polycarbonate resin, polyvinyl chloride resin, polyester resin, and resin containing any of these components as the main component. In view of adhesiveness, acrylic-based resin, ABS resin, AS resin, polycarbonate resin, polyvinyl chloride resin, and resin containing any of these components as the main component are preferred. Specifically, ABS resin, polycarbonate resin, and resin containing either of these components as the main component are more preferable.

Even if resin such as polyolefin-based resin, which can not be heat-bonded, is used, performing a surface treatment such as the above-described corona treatment or plasma treatment or providing an adhesive layer allows the resin to be used as a base material. The base material thus treated can be bonded with one selected from a group consisting of a film, a laminated film, and a laminated sheet.

A known method such as heat lamination can be used for manufacturing a laminated body of the present invention when the laminated body forms a sheet shape, and the base material can be heat-bonded. For example, as for the following base materials that can not be heat-bonded, the film can be stuck via an adhesive layer.

A wooden board such as a single wooden plate, a plywood, a particle board, and a medium-density fiberboard (MDF); a woody plate such as a wood fiber board; metal such as iron and aluminum; glass; an exemplary solar cell such as a single-crystal silicon type, a polycrystalline silicon type, an amorphous silicon type, a microcrystalline silicon type, a spherical silicon type, a thin film crystal silicon type, an amorphous silicon germanium type, a cadmium telluride type, a gallium arsenide type, a chalcopyrite type using a I-III-VI group compound including such as Cu, In, Ga, Al, Se, and S, for example, a copper indium selenide type or a similar type, an organic thin film type, a dye sensitization type, or a similar type.

A material used for an adhesive layer for the above-described solar cell includes, for example, the following kinds of resin: acid-modified polyolefin-based resin in which ethylene-vinyl acetate copolymer, ionomer resin, ethylene acrylic acid copolymer, ethylene methacrylic acid copolymer, polyethylene resin, polypropylene resin, and polyolefin-based resin such as polyethylene and polypropylene are denatured using unsaturated carboxylic acid such as acrylic acid, itaconic acid, maleic anhydride, and fumaric acid; silane-modified polyolefin-based resin denatured using unsaturated silane compound such as vinyltrimethoxy silane, vinyltriethoxy silane, vinyltripropoxy silane, vinyltriisopropoxy silane, vinyltributoxy silane, vinyltripentyloxy silane, vinyltriphenoxy silane, vinyltribenzyloxy silane, vinyltrimethylenedioxy silane, vinyltriethylenedioxy silane, vinylpropionyloxy silane, vinyltriacetoxy silane, and vinyltricarboxy silane; polyvinyl butyral resin; silicone-based resin; and epoxy-based resin or similar resin. These materials may be used alone or in combination of two or more kinds. Among these materials, in view of excellent adhesiveness, silane-modified polyolefin or acid-modified polyolefin is preferred to be used.

A known method such as an insert molding method and an in-mold molding method can be used for manufacturing a three-dimensional shape laminated body.

The in-mold molding method is processed in the following steps. A film, a laminated film, or a laminated sheet is heated. Subsequently, vacuum forming is performed in a mold having a vacuum drawing function. Then, resin serving as a base material in the same mold is injection-molded. By this method, the laminated body where the film, the laminated film, or the laminated sheet film is integrated with the base material is obtained. The in-mold molding method can perform film forming and injection molding in one process. Accordingly, the in-mold molding method is preferred in view of work efficiency and economic efficiency.

EXAMPLES

The present invention will be described below with reference to working examples. Total light transmittance, haze value, crystalline melting point, crystal fusion heat, and arithmetic mean roughness of a film were measured using the following methods. Mass-average molecular weight, molecular weight distribution, and melt mass-flow rate (MFR) of resin were measured using the following methods. Hereinafter, "parts" means "parts by mass".

(1) Total Light Transmittance

The film was cut into 5 cm pieces in horizontal and vertical directions. Total light transmittance was measured in compliance with JIS K7361-1 using a haze meter (manufactured by NIPPON DENSHOKU INDUSTRIES CO., LTD., product name: NDH2000).

(2) Haze Value

The film was cut into 5 cm pieces in horizontal and vertical directions. Haze value was measured in compliance with JIS K7105 using a haze meter (manufactured by NIPPON DENSHOKU INDUSTRIES CO., LTD., product name: NDH2000).

(3) Melting Peak Temperature, Crystal Fusion Heat

Melting peak temperature was measured under the following conditions. A differential scanning calorimeter (manufactured by PerkinElmer Inc., product name: Diamond DSC) was used. Then, as the crystalline melting point, the temperature rose in compliance with the method described in JIS K7121, 3.(2) under a condition of temperature rising speed of 10° C./minute. The heat absorption amount calculated by the fusion peak area was used as crystal fusion heat.

(4) Mass-Average Molecular Weight and Molecular Weight Distribution of the Acrylic-Based Resin (B)

Gel permeation chromatography (GPC) measurement was performed using tetrahydrofuran as a solvent. Next, polystyrene with known molecular weight was used as a standard sample and calibrated to obtain mass-average molecular weight (Mw) and number average molecular weight (Mn). The molecular weight distribution was calculated by dividing Mw by Mn.

(5) Melt Mass-Flow Rate (MFR) of the Vinylidene Fluoride-Based Resin (A)

In compliance with JISK7210, a sample was filled in a cylinder with the temperature held at 230° C., and this was kept for four minutes. Then, a load of 3.8 kg was applied to extrude the sample, and the extruded sample was extracted and weighted. The test was repeated three times, and the obtained values were averaged.

(6) Arithmetic Mean Roughness of the Film (Ra)

The arithmetic mean roughness of the film was obtained using a non-contact three-dimensional, scanning white light interference method. Measurement was performed on a surface that is in contact with a chill roll. The arithmetic mean roughness was obtained from the respective three different points on the surface, and then the obtained values were averaged. The measurement conditions were set as follows.

Measurement equipment: New-View6300 (manufactured by Zygo Corporation)
Analyze software: MetroPro software (manufactured by Zygo Corporation)
Objective lens: 2.5×
Intermediate lens zoom: 1×
Filter: High Pass
Measurement visual field: 2.81 mm×2.11 mm
Camera resolution: 320×240, 200 Hz

Working Example 1

As vinylidene fluoride-based resin (A-1), 80 parts of Kynar720 (polyvinylidene fluoride manufactured by Arkema Inc., product name, MFR: 14.2 [g/10 minutes], melting peak temperature of 173° C., vinylidene fluoride unit with 100% by mass) were used. As acrylic-based resin (B-1), 20 parts of a copolymer (with mass-average molecular weight of 100,000, molecular weight distribution of 2.0), which contains methyl methacrylate unit with 99% by mass and methyl acrylate unit with 1% by mass was used. The Kynar720 and the copolymer were mixed using a Henschel mixer. Then, the obtained mixture was supplied to a vented twin screw extruder (manufactured by TOSHIBA MACHINE CO., LTD., product name: TEM-35B), which was heated to 180 to 220° C., and then kneaded to obtain a pellet.

After the obtained pellet was dried at 85° C. for 24 hours, the dried pellet was supplied to a non-vented screw extruder of 40 mm φ (L/D=26) (Musashino Kikai Co., Ltd.) having T-die with 300 mm width and a screen mesh with 400 mesh. Then, the pellet was extruded on one chill roll at 40° C. with the extrusion temperature of 180 to 220° C., the T-die temperature of 220° C., and the T-die lip opening degree of 0.6 mm, and then a film with the thickness of 25 μm was obtained. The total light transmittance, the haze value, the melting peak temperature, the crystalline melting point fusion heat, and the arithmetic mean roughness of the obtained film are listed in Table 1.

Comparative Example 1

Instead of vinylidene fluoride-based resin (A-1), Kynar740 (polyvinylidene fluoride manufactured by Arkema Inc., product name, MFR: 0.5 [g/10 minutes], melting peak temperature of 173° C., vinylidene fluoride unit of 100% by mass) was used as vinylidene fluoride-based resin (A-2). Other conditions for Comparative example 1 are similar to Working example 1, and the film was obtained. Each evaluation result of the obtained film is listed in Table 1.

Working Examples 2 to 15 and Comparative Examples 2 to 4

Conditions of contents of vinylidene fluoride-based resin (A-1) and acrylic-based resin (B-1), chill roll temperature, and thickness of obtained films are listed in Table 1. Other conditions for Working examples 2 to 15 and Comparative examples 2 to 4 are similar to Working example 1, and the film was obtained. Each evaluation result of the obtained films is listed in Table 1.

In these working examples and comparative examples, the film thickness was adjusted only by changing rotation speed of the chill roll. That is, the rotation speed of the chill roll was changed to meet the following conditions. The rotation speed is 9 to 10 m/minute for a film with the thickness of 25 μm. The rotation speed is 4 to 5 m/minute for a film with the thickness of 50 μm. The rotation speed is 2 to 3 m/minute for a film with the thickness of 100 μm. Thus, films with the respective thickness were obtained.

Working Examples 16 and 17

As an ultraviolet absorbing agent, 2-(4,6-diphenyl-1,3,5-triazine-2-yl)-5-[(hexyl)oxy]-phenol (BASF, product name: Tinuvin1577FF) was used by 1 part by mass with respect to 100 parts by mass, which is the sum of vinylidene fluoride-based resin (A-1) and acrylic-based resin (B-1). Conditions of the chill roll temperature and the obtained film thickness are listed in Table 1. Other conditions for Working examples 16 and 17 are similar to Working example 1, and the film was obtained. Each evaluation result of the obtained film is listed in Table 1.

Working Example 18

As vinylidene fluoride-based resin (A-3), Kynar720 (polyvinylidene fluoride manufactured by Arkema Inc., MFR: 21.1 [g/10 minutes], vinylidene fluoride unit of 100% by mass, melting peak temperature of 173° C.) was used. The chill roll temperature was set to 50° C. Other conditions for Working example 18 are similar to Working example 1, and the film was obtained. Each evaluation result of the obtained film is listed in Table 1.

TABLE 1

| | Film composition (parts) | | | | | | | | | | | |
|---|---|---|---|---|---|---|---|---|---|---|---|---|
| | Vinylidene fluoride-based resin (A-1) MFR = 14.2 | Vinylidene flouride-based resin (A-2) MFR = 0.5 | Viylidene fluoride-based resin (A-3) MFR = 21.1 | Acrylic-based resin (B-1) | Ultraviolet absorbing agent | Chill roll temperature (° C.) | Film thickness (μm) | Total light transmittance (%) | Haze value (%) | Melting peak temperature (° C.) | Crystal fusion heat (J/g) | Arithmetic mean roughness (nm) |
| Working example 1 | 80 | — | — | 20 | — | 40 | 25 | 93.9 | 0.6 | 165 | 27 | 7 |
| Working example 2 | 80 | — | — | 20 | — | 40 | 50 | 93.9 | 0.5 | 165 | 27 | 6 |
| Working example 3 | 80 | — | — | 20 | — | 40 | 100 | 93.8 | 0.4 | 165 | 27 | 5 |
| Working example 4 | 80 | — | — | 20 | — | 50 | 25 | 93.9 | 0.5 | 165 | 27 | 7 |
| Working example 5 | 80 | — | — | 20 | — | 50 | 50 | 93.9 | 0.3 | 165 | 27 | 5 |
| Working example 6 | 80 | — | — | 20 | — | 50 | 100 | 93.8 | 0.3 | 165 | 27 | 4 |
| Working example 7 | 80 | — | — | 20 | — | 60 | 25 | 93.8 | 0.5 | 165 | 30 | 7 |
| Working example 8 | 80 | — | — | 20 | — | 70 | 25 | 93.6 | 1.0 | 165 | 31 | 7 |
| Working example 9 | 85 | — | — | 15 | — | 40 | 25 | 93.9 | 0.5 | 166 | 32 | 7 |

TABLE 1-continued

|  | Film composition (parts) | | | | | | | | | | | |
|---|---|---|---|---|---|---|---|---|---|---|---|---|
|  | Vinylidene fluoride-based resin (A-1) MFR = 14.2 | Vinylidene flouride-based resin (A-2) MFR = 0.5 | Viylidene fluoride-based resin (A-3) MFR = 21.1 | Acrylic-based resin (B-1) | Ultraviolet absorbing agent | Chill roll temperature (°C.) | Film thickness (μm) | Total light transmittance (%) | Haze value (%) | Melting peak temperature (°C.) | Crystal fusion heat (J/g) | Arithmetic mean roughness (nm) |
| Working example 10 | 85 | — | — | 15 | — | 40 | 50 | 93.9 | 0.4 | 166 | 32 | 6 |
| Working example 11 | 85 | — | — | 15 | — | 40 | 100 | 93.8 | 0.7 | 166 | 32 | 6 |
| Working example 12 | 85 | — | — | 15 | — | 50 | 25 | 94.0 | 0.6 | 166 | 32 | 8 |
| Working example 13 | 85 | — | — | 15 | — | 50 | 50 | 93.8 | 0.6 | 166 | 32 | 5 |
| Working example 14 | 90 | — | — | 10 | — | 40 | 25 | 94.1 | 0.9 | 166 | 35 | 7 |
| Working example 15 | 80 | — | — | 20 | — | 36 | 100 | 93.7 | 0.2 | 163 | 21 | 7 |
| Working example 16 | 80 | — | — | 20 | 1 | 50 | 25 | 93.8 | 0.6 | 164 | 27 | 7 |
| Working example 17 | 80 | — | — | 20 | 1 | 50 | 100 | 93.5 | 0.4 | 164 | 30 | 4 |
| Working example 18 | — | — | 80 | 20 | — | 50 | 25 | 93.7 | 0.4 | 165 | 27 | 5 |
| Comparative example 1 | — | 80 | — | 20 | — | 50 | 25 | 93.9 | 2.1 | 165 | 25 | 21 |
| Comparative example 2 | 80 | — | — | 20 | — | 80 | 25 | 94.1 | 3.8 | 165 | 31 | 8 |
| Comparative example 3 | 100 | — | — | — | — | 40 | 25 | 94.6 | 8.7 | 167 | 41 | 10 |
| Comparative example 4 | 70 | — | — | 30 | — | 50 | 100 | 93.4 | 1.6 | 161 | 17 | 15 |

(Evaluation Result)

As apparent from Table 1, a film obtained by the methods of working examples of the present invention has excellent heat resistance and transparency and a small haze value even if the film is thick.

In contrast, in Comparative example 1 where the arithmetic mean roughness of the film is large, in Comparative example 2 where the surface temperature of the chill roll temperature is high, and in Comparative example 3 where the vinylidene fluoride-based resin (A) only was used without containing acrylic-based resin (B), films with a large haze value were obtained.

It is apparent that the film of Comparative example 4 has small melting peak temperature and crystal fusion heat, and heat resistance was reduced. Due to poor delamination from the chill roll, a scratch was made on the film surface at manufacture, and a film with a large haze value was obtained. In addition, a blocking occurred.

Industrial Applicability

The film according to the present invention can be preferably applied to the following applications: automobile exterior applications such as a weather strip, a bumper, a bumper guard, a side mudguard, a body panel, a spoiler, a front grille, a strut mount, a wheel cap, a center pillar, a door mirror, a center ornament, a side molding, a door molding, a window molding, a window, a head lamp cover, a tail lamp cover, and a windshield part; automobile interior applications such as an instrument panel, a console box, a meter cover, a door lock bezel, a steering wheel, a power window switch base, a center cluster, and a dashboard; applications such as a front panel, a button, an emblem, and a surface decoration material of AV equipment and house furnishings; applications such as a housing, a display window, and a button of a mobile phone or a similar device; applications such as an exterior material for house furnishings; applications for an interior material for architecture such as a wall surface, a ceiling, and a floor; applications for an exterior material for architecture such as an outer wall such as siding, a wall, a roof, a gate, and a bargeboard; applications for a surface decoration material for house furnishings or a similar object such as a window frame, a door, a balustrade, a sill, and a crossbar; various displays; applications for optics such as a Fresnel lens, a polarizing film, a polarizer protective film, a phase difference film, a light diffusion film, a viewing angle expansion film, a reflection film, an anti-reflection film, an anti-glare film, a brightness enhancement film, a prism sheet, a microlens array, a conductive film for a touch panel, a film for light guiding, and a film for electronic paper; a window glass; applications for interior or exterior of various vehicles other than an automobile such as an electric train, an aircraft, and a ship; various packaging containers and packaging materials such as a bottle, a cosmetic container, and an accessory case; films for other various applications such as sundries such as a gift product and an accessory or a similar object; a solar cell surface protective film, a sealing film for solar cell, a backside protective film for solar cell, a solar cell base film, a greenhouse for agriculture, a protective film for a highway sound insulating board, and an outermost surface protective film for a traffic sign, or a similar film.

The invention claimed is:

1. A film containing vinylidene fluoride-based resin (A) and acrylic-based resin (B), wherein the film has at least one surface with arithmetic mean roughness of 0.1 to 20 nm, the film having crystal fusion heat of 18 to 40 J/g and a haze value of 3.5 or less, and the crystal fusion heat being measured using a differential scanning calorimeter.

2. A method of manufacturing a film containing vinylidene fluoride-based resin (A) and acrylic-based resin (B), wherein the film has at least one surface with arithmetic mean roughness of 0.1 to 20 nm, the film having crystal fusion heat of 18 to 40 J/g and a haze value of 3.5 or less, and the crystal fusion heat being measured using a differential scanning calorimeter, comprising:

melt-extruding a resin composition containing 75 to 95% by mass of the vinylidene fluoride-based resin (A) and 5 to 25% by mass of the acrylic-based resin (B), wherein the vinylidene fluoride-based resin (A) has a melt mass-flow rate equal to or more than 10 [g/10 minutes], and the melt mass-flow rate is measured in compliance with JISK7210 under conditions of 230° C. and a load of 3.8 kg.

3. A method of manufacturing a film, comprising melt-extruding a resin composition containing 75 to 95% by mass of vinylidene fluoride-based resin (A) and 5 to 25% by mass of acrylic-based resin (B), and subsequently bringing the obtained melt extrudate into contact with at least one chill roll having the surface temperature of 35 to 75° C., wherein the vinylidene fluoride-based resin (A) has a melt mass-flow rate equal to or more than 10 [g/10 minutes] minutes, and the melt mass-flow rate is measured in compliance with JISK7210 under conditions of 230° C. and a load of 3.8 kg.

4. The method of manufacturing the film according to claim 2, wherein the acrylic-based resin (B) is resin containing equal to or more than 50% by mass of an alkyl methacrylate unit, wherein the alkyl methacrylate unit contains an alkyl group with 1 to 4 carbon atoms.

5. A film obtained by the manufacturing method according to claim 2.

6. A film obtained by the manufacturing method according to claim 4.

7. A laminated film or a laminated sheet, wherein a thermoplastic resin layer is laminated on the film according to claim 5.

8. A laminated film or a laminated sheet wherein a thermoplastic resin layer is laminated on the film according to claim 6.

9. A laminated body, wherein a base material is laminated on the film according to claim 5.

10. A laminated body, wherein a base material is laminated on the film according to claim 6.

11. A laminated film or a laminated sheet, wherein a thermoplastic resin layer is laminated on the film according to claim 1.

12. A laminated body, wherein a base material is laminated on the film according to claim 1.

13. The method of manufacturing the film according to claim 3, wherein the acrylic-based resin (B) is resin containing equal to or more than 50% by mass of an alkyl methacrylate unit, wherein the alkyl methacrylate unit contains an alkyl group with 1 to 4 carbon atoms.

14. A film obtained by the manufacturing method according to claim 3.

* * * * *